United States Patent [19]
Dromigny

[11] Patent Number: 4,784,593
[45] Date of Patent: Nov. 15, 1988

[54] DEVICE FOR POSITIONING A FILM, AND MOULDING MACHINE INCORPORATING SAID DEVICE

[76] Inventor: Pierre Dromigny, 54 avenue de Versailles, 75016 Paris, France

[21] Appl. No.: 110,278

[22] Filed: Oct. 20, 1987

[30] Foreign Application Priority Data

Nov. 19, 1986 [FR] France ............................ 86 16101

[51] Int. Cl.⁴ .................... B29C 41/20; B29C 41/36
[52] U.S. Cl. ................................. 425/121; 425/125; 425/397; 425/441; 425/126.1
[58] Field of Search ............... 425/121, 125, 126 R, 425/130, 397, 436 R, 437, 441

[56] References Cited

U.S. PATENT DOCUMENTS

| | | | |
|---|---|---|---|
| 3,602,496 | 8/1971 | Langenoll | 271/14 |
| 3,619,858 | 11/1971 | Sutch | 18/5 R |
| 3,869,234 | 3/1975 | Sutch | 425/112 |
| 3,899,277 | 8/1975 | Winter | 425/383 |
| 3,941,539 | 3/1976 | Saumsiegle et al. | 425/441 X |
| 4,233,006 | 11/1980 | Panas | 425/441 X |
| 4,281,707 | 8/1981 | Leleu | 425/441 X |
| 4,462,952 | 7/1984 | Hautemont | 425/126 R X |
| 4,540,460 | 9/1985 | Blomquist et al. | 425/126 R X |
| 4,549,863 | 10/1985 | Bourgeois | 425/126 R |
| 4,563,148 | 1/1986 | Hasl et al. | 425/125 X |
| 4,680,000 | 7/1987 | Nowicki et al. | 425/126 R |
| 4,686,076 | 8/1987 | Dromigny et al. | 425/397 X |
| 4,710,116 | 12/1987 | Dromigny et al. | 425/125 |

*Primary Examiner*—Robert Spitzer
*Attorney, Agent, or Firm*—Fisher, Christen & Sabol

[57] ABSTRACT

This invention relates to a device for positioning a film of determined format, serving as at least a partial coating of the lateral surface of an object, between two pieces of a machine, at least one of said pieces being mobile with respect to the other in a first direction, the machine having a technique for taking the film from a magazine. According to the invention, the film-taking technique uses a member whose outside shape corresponds to the lateral surface of the object to be coated. It also includes a technique for applying the film onto the lateral surface. Further there is provided a technique for conveying the film-taking means, with the film applied on said member, between a position of taking the film from the magazine and a work position between the pieces of the machine.

8 Claims, 5 Drawing Sheets

DEVICE FOR POSITIONING A FILM, AND MOULDING MACHINE INCORPORATING SAID DEVICE

The present invention relates to a device for positioning a film of determined format between two pieces of a machine, of which pieces at least one is mobile with respect to the other in a first direction. The invention is particularly, but not exclusively, applied to a moulding machine.

Different devices are known for conveying a film of determined format from a magazine containing a plurality of said films to a work position between two pieces of a machine, particularly a moulding machine. Said films are intended to coat an object, for example a moulded object, at least partially and are generally presented on the object in a flat form, for example rectangular, covering for example the bottom or the top of a boat-shaped receptacle. Said films are thus "integrated" in the object during moulding thereof.

Now, up to the present time, the problem of coating in situ, i.e. in the mould, the lateral surfaces of objects such as for example the truncated or possibly substantially cylindrical lateral surface of a pot for containing milk preparations, automatically, and therefore rapidly, has not been solved.

In this spirit, the invention relates to a device for automatically positioning a film of determined format, intended to serve as at least partial coating of the lateral surface of an object, for example a moulded object, between two pieces of a machine, such as for example a moulding machine, said device being simple and reliable and allowing high production rates.

To that end, the device for positioning a film of determined format, serving as at least partial coating of the lateral surface of an object, for example a moulded object, between two pieces of a machine such as, for example, a moulding machine, at least one of said pieces being mobile with respect to the other in a first direction, said device comprising means for taking the film from a magazine containing a plurality of said films, is noteworthy, according to the invention, in that the film-taking means comprise a member whose outside shape corresponds to the lateral surface of the object to be coated, and means for applying the film on the lateral surface of said member, and in that means are provided for conveying said film-taking means, with the film which is applied on said member, between a position of taking the film from the magazine and a work position between said pieces. In this way, the film may be guided and deposited in the cavity of the mould, having taken a shape which corresponds to the lateral surface of the object to be coated.

To facilitate application and holding of the film on the film-taking member, the film-taking means may comprise means for rotating said member about its axis so that, during rotation of said member on itself, the film which is applied thereon is wound at least partially therearound.

The means for conveying the film-taking means advantageously comprise a system of two racks intersecting each other, of which one, parallel to said first direction, is fast with a first piece of said machine and the other, which is parallel to a second direction at right angles to said first direction and which may slide in a guide fast with the second piece of the machine, is fast with said film-taking member.

According to another feature of the invention, said film-taking means comprise means for pivoting said member about an axis perpendicular to the plane defined by the first and second directions.

According to a further feature of the invention, said film-taking means comprise means for displacing said member in said first direction so as to be able to introduce said member into the cavity of the mould.

When the film is to be wound substantially around the whole lateral surface of said member, depression means are distributed over the whole lateral surface of said member.

According to another feature of the invention, the means for rotating the film-taking member comprise a rack capable of being displaced transversely to said axis of the member and adapted to cooperate with a pinion mounted on the pivot pin constituting said axis.

In particular, the film-taking member is substantially truncated in form.

According to yet another feature of the invention, drive means are associated with the film magazine to animate this latter, independently of said pieces but in synchronism therewith, in a reciprocating movement parallel to said first direction.

The invention will be more readily understood on reading the following description with reference to the accompanying drawings, in which.

Figure 1:
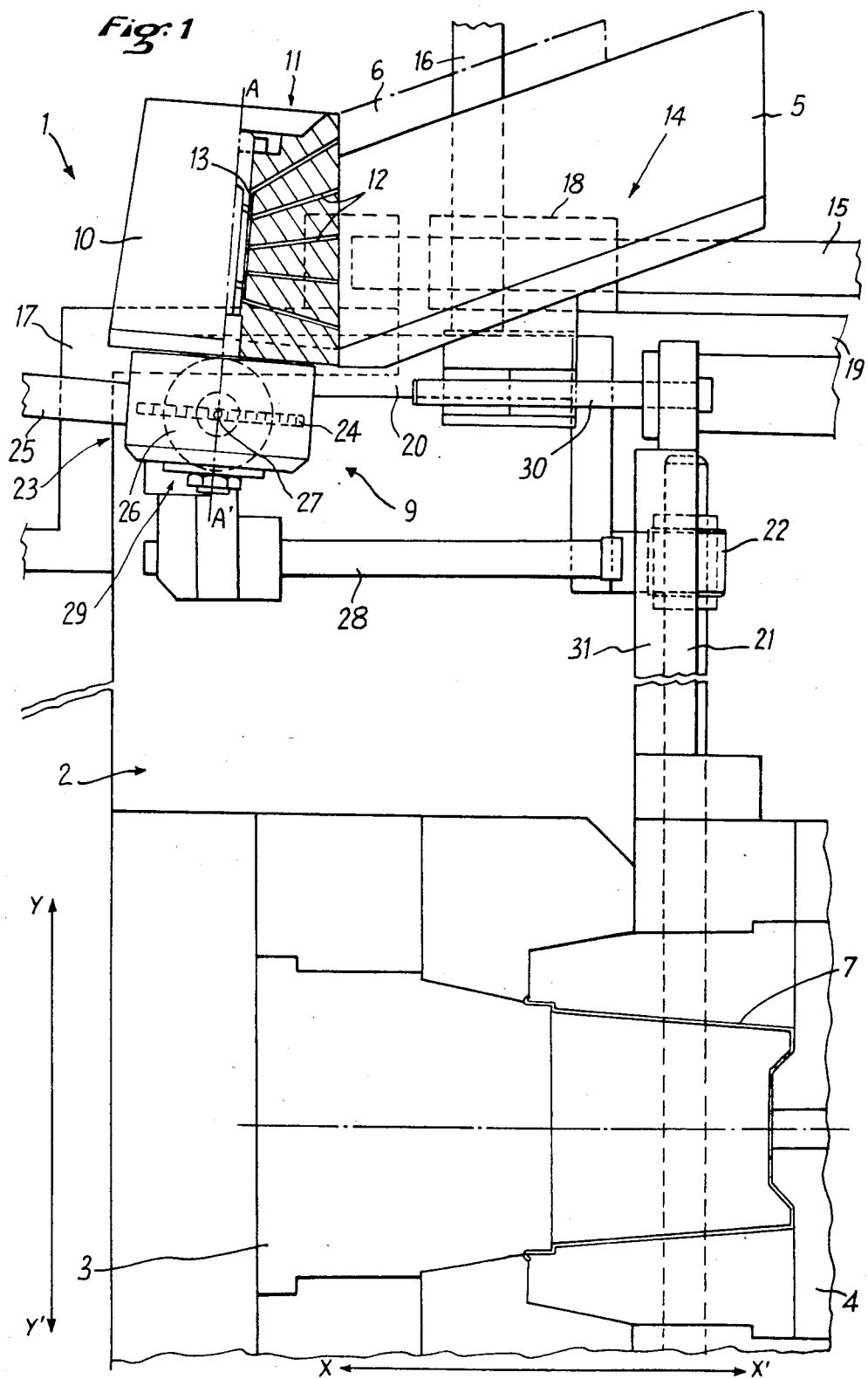
FIG. 1 is a schematic view in elevation, in partial section, of a mould comprising the film-conveying device of the invention.

Referring now to the drawings, in the embodiment shown, the device 1 of the invention is applied to a moulding machine 2 comprising two mould parts, one male 3, the other female 4, of which at least one is mobile with respect to the other in a first direction X, X'.

Device 1 is intended for positioning a film of determined format, initially contained in a magazine 5 receiving a plurality of films 6, in the cavity 7 of the female mould part 4.

Each film 6 must serve as at least partial coating of the lateral surface of a moulded object 8 (FIG. 2e), object which may, as shown, be truncated in form and which may for example be a pot for containing a milk preparation. The film will be "integrated", during moulding, in the lateral surface of the object and may serve as support for a decoration, information as to the contents of the recipient, a trademark, etc...

To perform its function, the device 1 of the invention comprises means 9 for taking the end film 6 contained in the magazine 5, which film-taking means 9 comprise a member 10 whose outer shape corresponds to the lateral surface of the object 8 to be coated, in the case shown a truncated shape, and means, such as depression means 11, distributed over the whole lateral surface of the member 10, for applying the film 6 on the lateral surface of the member 10. The depression means 11 may be constituted, as shown, by depression channels 12 supplied from the axial part 13 of the member 10.

The device 1 of the invention further comprises means 14 for conveying the film-taking means, with the film applied on the member 10, between a position of taking the film and a position of work between the male and female parts 3 and 4 respectively of the mould, as will be explained hereinafter in greater detail with reference to FIGS. 2a to 2h.

The conveying means 14 are constituted, in the embodiment shown, by a system of two intersecting racks 15 and 16 meshing with each other, of which one, 15, parallel to the first direction X, X', is fast via a support 17 with a first mould part (in the example shown, the male mould part 3), and the other, 16, which is parallel to the second direction Y, Y' and which may slide, like rack 15, in a guide 18 fast via a support 19 with the other part 4 of the mould, is fast via a cross-piece 20 with the film-taking means 9. Moreover, the crosspiece 20 is connected to a support 21 fast with the female mould part 4 via a guide 22 with the result that the film-taking means 9 may slide along the support 21.

The film-taking means 9 further comprise means 23 for rotating the member 10 about its axis A, A' so that, during rotation of said member on itself, the film which is applied thereto winds therearound. Said means 23 comprise a rack 24 adapted to be displaced transversely to axis A, A' of the member by means of a linear stroke jack 25 and capable of cooperating with a pinion (not shown) mounted on the pivot pin of member 10.

The film-taking means 9 further comprise a rotating jack 26 for pivoting the member 10 about an axis 27 perpendicular to the plane defined by the first and second directions X, X' and Y, Y' respectively, as well as a linear stroke jack 28 for displacing the member 10 in the first direction X, X' so as to be able to introduce the member 10 into the cavity of the female mould part 4.

The jack assembly 25, 26 and 28 is mounted on a support part 29 fast with the film-taking member 10 and placed therebeneath.

As to the magazine 5 of films 6, it is associated with a linear stroke jack 30 for animating the magazine, independently of the mould parts but in synchronism therewith, in a reciprocating movement parallel to the first direction X, X'. The jack 30 is mounted on a support 31 fast with part 4 of the mould.

Operation of the device according to the invention will be set forth hereinafter with reference to FIGS. 2a to 2h.

Figure 2A:
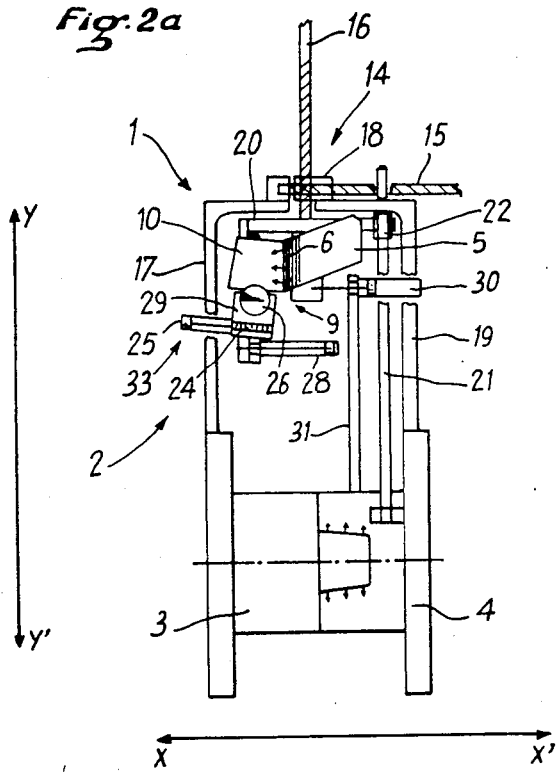
FIGS. 2a to 2h illustrate the different steps of operation of the device of the invention.

FIG. 2a illustrates the step in which, the mould being closed and the member 10 being in film-taking position, the magazine 5 advances, under the action of jack 30, against the member 10 so that the end film contained in the magazine can be sucked on the member 10 with the aid of the depression means 11.

Figure 2B:
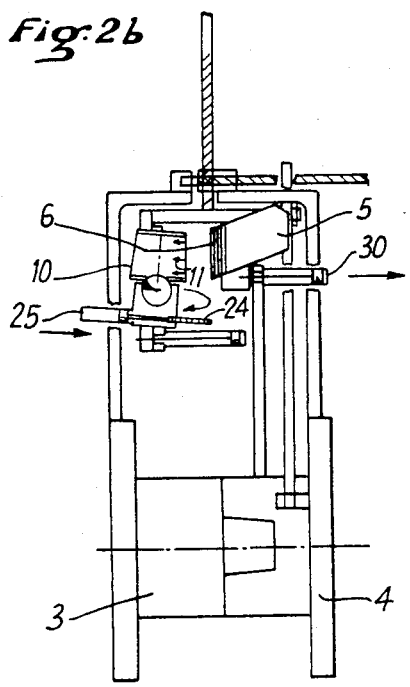
Figure 2C:
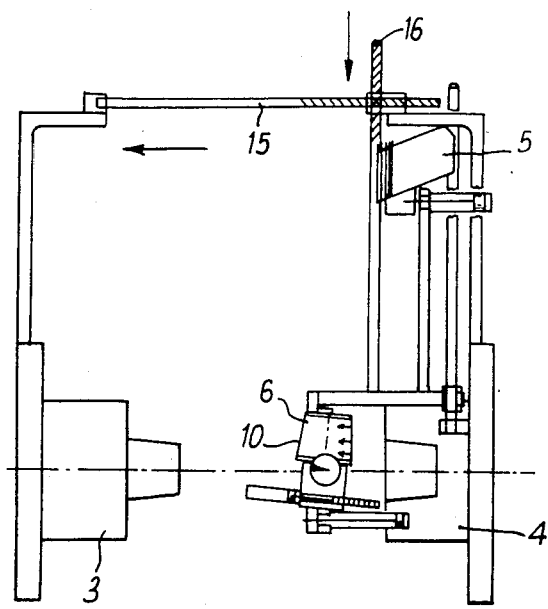
Figure 2D:
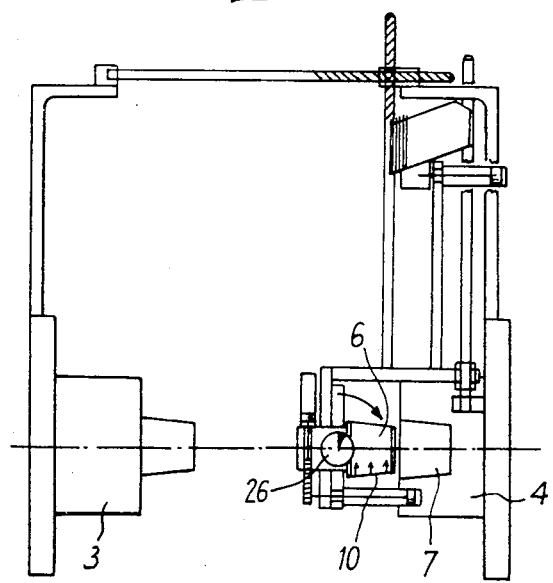

Thereafter, as illustrated in FIG. 2b, the magazine 5 moves back, still under the action of jack 30, and the member 10 rotates on itself under the action of means 23 (jack 25 plus rack 24, and pinion) so that the film 6 winds around the member 10 and is firmly applied thereon.

At the same time as the mould opens, the film-taking means 9, with the film 6 applied on member 10, then descend into work position between the male and female mould parts 3 and 4 respectively (FIG. 2c), and this thanks to the system of intersecting racks.

Figure 2E:
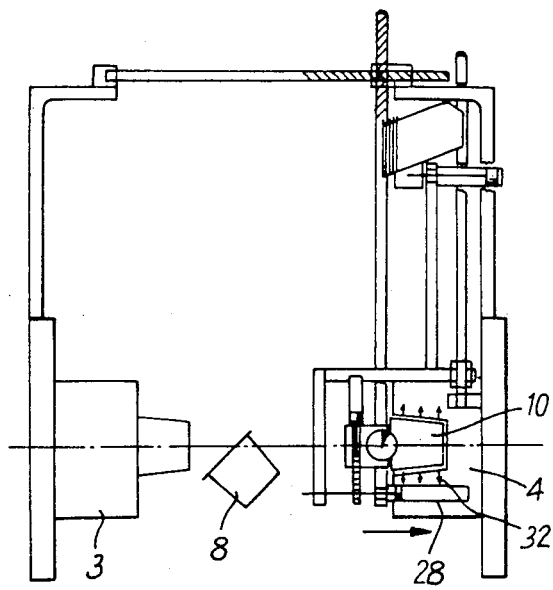

In a fourth step (FIG. 2d), the member 10 pivots in the axis of the mould thanks to the rotating jack 26, then the actuation of jack 28 makes it possible to introduce the member 10 into the cavity of the female mould part 4, at the same time as the object 8 which has just been moulded and ejected from the mould (FIG. 2e). Once the member 10 is introduced at the bottom of the cavity of the mould, the depression means 11 of the member 10 are cut, whilst depression means 32 provided in said cavity are put into action with the result that the film is deposited and maintained in the cavity, coating the truncated lateral surface thereof.

Figure 2F:
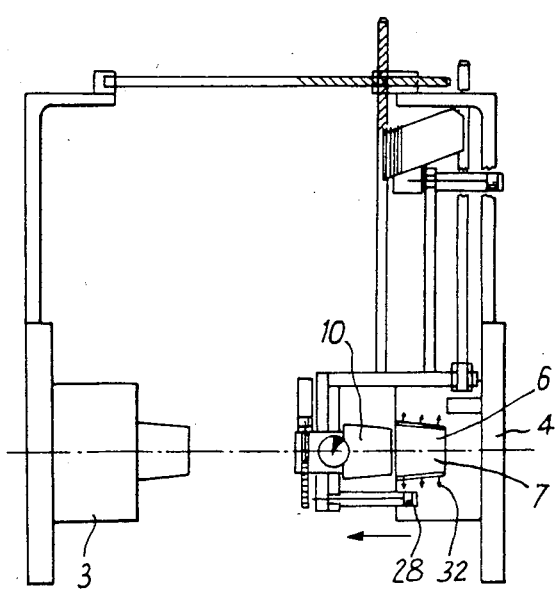
Figure 2G:
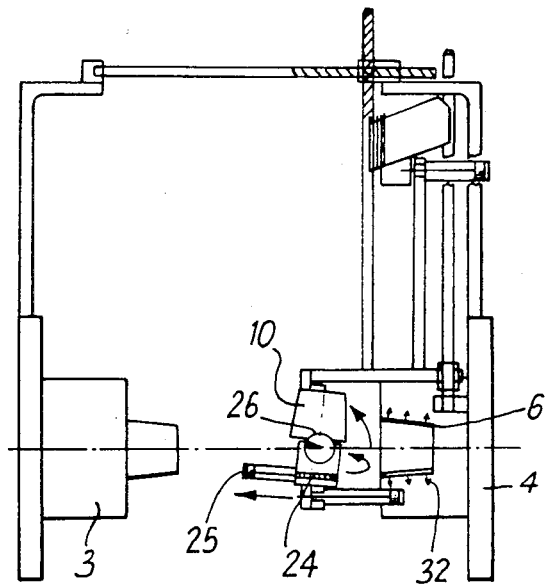

Actuation of the jack 28 then makes it possible to withdraw the member 10 from the cavity 7 of the mould (FIG. 2f). The rotary jack 26 then pivots the member 10 in the position of FIG. 2c, at the same time as the rack 24 is returned into its initial position by jack 25, this rotating, via the pinion, the member 10 into the position of FIG. 2a (FIG. 2g).

Figure 2H:
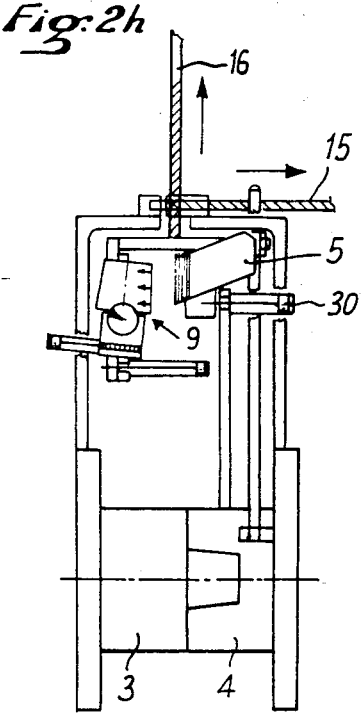

The film-taking means 9 then rise and the mould 3, 4 closes simultaneously thanks to the system of racks 15 and 16 (FIG. 2h). When the magazine 5 has advanced, under the action of jack 30, against member 10, the device 1 of the invention will be in the initial position illustrated in FIG. 2a, beginning of a new cycle of manufacture of a moulded object comprising a film "integrated" in its lateral surface.

What is claimed is:

1. In a device for positioning a film of determined format, intended to serve as at least a partial coating of the lateral surface of an object disposed in a cavity between two pieces of a machine at least one of said pieces of said machine being mobile with respect to the other in a first direction, said device comprising means for taking the film from a magazine containing a plurality of said films, comprising a film taking member whose outside form corresponds to the lateral surface of the object to be coated, means for applying the film on the lateral surface of said film taking member, and means for rotating said member about its axis so that, during rotation of said member, the film which is applied thereon is wound therearound at least partially, means being provided for conveying said film-taking means between a position of taking the film from the magazine and a work position between said pieces, the means for conveying the film-taking means comprise a system of two intersecting racks meshing with each other, of which one, parallel to a first direction (X, X'), is fast with the first piece of the machine and the other, which is parallel to a second direction (Y, Y') at right angles to said first direction (X, X') and which is adapted to slide in a guide fast with the second piece of the machine, is fast with said film-taking means.

2. The device of claim 1, wherein said film-taking means comprise means for pivoting said member about a pivot pin perpendicular to the plane defined by the first direction (X, X') and second direction (Y, Y').

3. The device of claim 2, wherein the means for rotating the film-taking member about its pivot pin comprise a rack adapted to be displaced transversely to said axis of the member and being able to cooperate with a pinion mounted on said pivot pin constituting said axis.

4. The device of claim 1, wherein said film-taking means comprise means for displacing said member in said first direction (X, X') so as to be able to introduce said member into the cavity of the machine.

5. The device of claim 1, wherein depression means are distributed over said lateral surface of the film-taking member.

6. The device of claim 1, wherein the film-taking member is substantially truncated in form.

7. The device of claim 1, wherein drive means are associated with the film magazine to animate this latter, independently of said pieces but in synchronism therewith, in a reciprocating movement parallel to said first direction (X, X').

8. Moulding machine, wherein it comprises the film-positioning device of claim 1.

* * * * *